April 26, 1949.  T. S. HOLMES  2,468,669
NOSE GEAR TOW BAR
Filed July 16, 1947
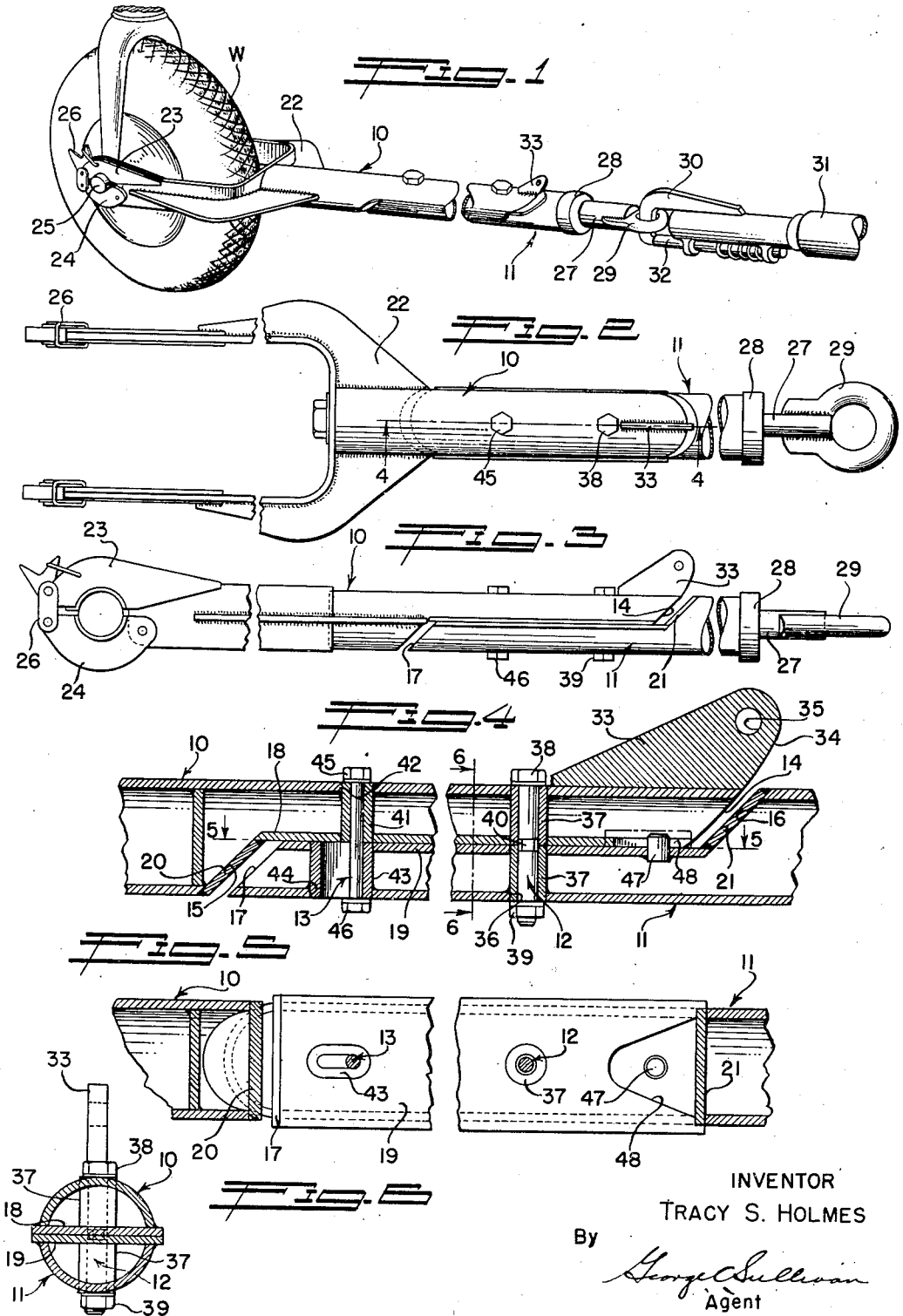
INVENTOR
TRACY S. HOLMES
By
George Sullivan
Agent

UNITED STATES PATENT OFFICE 2,468,669

NOSE GEAR TOW BAR

Tracy S. Holmes, Burbank, Calif., assignor to Airquipment Company, Burbank, Calif.

Application July 16, 1947, Serial No. 761,288

11 Claims. (Cl. 280—33.14)

This invention relates to towing equipment and relates more particularly to towbars useful in towing airplanes, and the like, by means of tractors or other ground draft vehicles.

It is frequently necessary to move an airplane about on the ground for servicing, repairs, refueling, storage, etc. Tractors or equivalent ground vehicles are employed for this purpose and are connected with the landing gear of the airplane by towbars. It is desirable to construct the towbars so as to protect the landing gear from damage in the event the towing loads become excessive. Towbars have been introduced embodying shear pins intended to fail when such excessive loading occurs. However, the design of the prior towbars of this class has been such that under certain circumstances they will jacknife or buckle and thus damage the landing gear upon the failure of the shear pins.

It is a general object of this invention to provide a towbar of the class referred to that dependably protects the landing gear of the airplane from all hazards and damage in the event the towing loads become excessive for any reason whatsoever.

Another object of the invention is to provide a towbar of the class referred to that will not buckle or jacknife under any circumstances. The towbar of this invention will part and become two entirely disconnected sections when the tension, compression or torque loading, or any combination thereof, becomes excessive. The device will not fold or buckle under heavy compression or side loading that often tends to cause buckling of conventional towing devices.

Another object of the invention is to provide a towbar of the character mentioned constructed to have a single or common shear plane for the shear pins or shear bolts. The device has two sections presenting abutting axially extending surfaces providing a shear plane or plane of separation which intersects, or includes, the central longitudinal axis of the assembly, and the shear pins which are engaged or anchored in the two sections pass transversely through this common plane to be subject to all tensile, compression and torsional loading on the towbar. The two sections are free to move or slide, one upon the other in this common plane, upon the failure of the shear pins and are thus free to entirely separate immediately upon breaking of the shear pins or bolts.

Another object of the invention is to provide a towbar of the kind described in which the shear pins or bolts are arranged and related in such a manner that two pins or bolts assume compression loading, one of said pins or bolts assumes the tensile loading and the other of said pins or bolts assumes the torque or side loads. The construction is such that both pins or bolts fail under excessive towing loads of any character but the separate pins which are of known shear strengths normally assume the tensile and torsion loading respectively and both pins assume the compression loads. This makes it possible to give the towbar any required or selected tensile compression and torque ratings and yet requires only the two shear pins or bolts.

Other objectives and advantages of the invention will become apparent from the following detailed description of a typical preferred form of the invention throughout which description reference will be made to the accompanying drawings in which:

Figure 1 is a perspective view of the towbar of this invention coupled with the landing gear of an airplane;

Figure 2 is an enlarged plan view of the towbar;

Figure 3 is a side elevation of the towbar;

Figure 4 is an enlarged fragmentary vertical detailed sectional view taken as indicated by line 4—4 of Figure 2;

Figure 5 is a fragmentary horizontal detailed sectional view taken substantially as indicated by line 5—5 on Figure 4; and Figure 6 is a transverse detailed sectional view taken as indicated by line 6—6 on Figure 4.

The towbar of the invention may be said to comprise two main or principal sections 10 and 11, normally connected by two shear pins or bolts 12 and 13.

While the principal sections 10 and 11 may be constructed of any selected material or stock, I have found it economical to fabricate them from a length of pipe or a tube. The two sections 10 and 11 are elongated and complementary to together constitute an elongate assembly that is substantially round or cylindrical in transverse cross-section. When the sections 10 and 11 are formed from a tube, the tube is cut approximately half way through at an angle of about 45 degrees and at two longitudinally spaced planes at opposite sides so that the section 10 has two longitudinally spaced forwardly facing inclined end surfaces 14 and 15 and the section 11 has two similar and opposing inclined end surfaces 16 and 17. The tube is then cut or slit lengthwise so that an axial cut connects the two angular cuts. This separates the two sections 10 and 11 and gives each section the configuration of a half tube for the distance between their respective inclined end surfaces 14 and 15, and 16 and 17. When the axial cut surfaces are dressed down, plates 18 and 19 are welded or otherwise fixed to the inner or axial edges of the sections 10 and 11 respectively. The outer or exposed surfaces of the flat plates 18 and 19 are then engaged one upon the other in such a manner that the inclined end surfaces 14 and 16, and 15 and 17 are in spaced adjacent opposing relation as best illustrated in Figures 3 and 4. It will be observed that the two flat plates 18 and 19 engage one another at a central diametrical and axial plane of the assembly. This constitutes the shear plane of the towbar as will later become apparent.

It is desirable to weld or otherwise fix a baffle plate or guide plate 20 on the inclined end surface 15 and to provide a similar plate 21 on the end surface 16. These plates 20 and 21 cause the sections 10 and 11 to slide one past or over the other when the pins or bolts 12 and 13 fail under compression and prevent the sections from binding or locking one with the other when this occurs.

The outer or rear end of the section 10 is equipped with suitable means for engaging or coupling with the landing gear of the airplane. In Figure 1, I have shown the section 10 provided with a yoke or fork 22 for straddling the nose wheel W of a nose wheel gear of typical design. The arms of the fork 22 have suitable jaws 23 and 24 for engaging about the axle of the gear or a rod 25 passed through the tubular axle. The jaws 24 are hinged or pivoted on the fork 22 and suitable toggle latches 26 serve to hold the jaws 24 in the closed or operative positions. It is to be understood that the structure just described may be varied materially to adapt the towbar for use with landing gear, etc., of other types and the invention is not to be taken as limited to the employment of the particular fork and jaw arrangement illustrated in the drawings.

The outer or forward end of the bar section 11 is provided with means for facilitating connection of the towbar with the tractor or other draft vehicle. In the simple construction illustrated, a rod 27 extends from a cap 28 on the section 11 and carries a bail or ring 29. The ring 29 is adapted to receive a hook 30, or the equivalent, on the draft bar 31 of the tractor or towing vehicle (not shown). A spring-loaded keeper 32 may cooperate with the hook 30 to prevent its disengagement from the ring 29.

I provide an upstanding skid 33 on the forward end portion of the section 10. The skid 33 extends upwardly and forwardly or toward the tractor and its forward and upper edge 34 is curved so that it will slide or ride over the ground or floor without digging in, in the event the towbar parts under excessive load and the inertia of the airplane carries the towbar section 10 forwardly. The above-described inclined end 14 of the section 10 may be slightly curved to merge with and form a continuation of the curved edge of the skid 33. An opening 35 may be provided in the skid 33 to receive a rope, or the like, to facilitate handling of the towbar and to tie the towbar up to the airplane when not in use.

The above mentioned shear pin or bolt 12 is arranged to assume the tensile loads imposed on the towbar and assists in assuming the compression loads. In accordance with the invention the shear bolt 12 is engaged or anchored in the sections 10 and 11 in such a manner as to extend transversely through the above-described shear plane defined by the opposing plates 18 and 19. It is preferred to sustain or support the major portions of the bolt 12 so as to prevent bending and to assure clean shearing of the bolt when it breaks under an excessive load. Accordingly, I provide aligned transverse openings 36 in the walls of the sections 10 and 11 and their plates 18 and 19 and arrange tubes 37 in the aligned openings to receive the shear bolt 12. The inner ends of the tubes 37 may be flush with the faces of the plates 18 and 19. The tubes 37 are suitably secured in place, for example, they may be welded to the walls of the sections 10 and 11. I have shown the shear pin 12 in the form of a bolt provided at one end with a head 38 and washer for engaging the wall of one bar section and provided at the other end with a nut 39 and washer for engaging the wall of the other bar section. It is to be understood that the member 12 may take the form of a simple pin suitably secured in place. The bolt 12 is preferably removable so that it may be replaced by a bolt 12 of a different strength. The bolt 12 has a portion 40 of reduced diameter at the shear plane, it being apparent that this portion of the selected pin may have any given cross-sectional area to impart the desired strength to the bolt.

The shear pin or bolt 13 assists in assuming the compression forces but is primarily intended to fail when a known or given excessive torsional load is imposed on the towbar. The bolt 13 is spaced axially from the bolt 12 and passes transversely through the above-described shear plane of the towbar assembly. A tube 41, similar to the beforementioned tubes 37, is arranged in transverse openings 42 in the section 10 and its plate 18 to receive a portion of the bolt 13. A tube 43 of elongated transverse cross-section is arranged in correspondingly shaped openings 44 in the plate 19 and the wall of the section 11 to receive the other end portion from the bolt 13. The tubes 41 and 43 are fixed in their respective openings as by welding. The shear pin 13 is illustrated as being a bolt provided at one end with a head 45 and at the other end with a nut 46. In the drawings the parts are formed and related so that the bolt 13 is in engagement with the forward end of the elongated opening in the tube 43 when the sections 10 and 11 are in the assembled operative load-transmitting positions. Accordingly, the bolt 13 assists the bolt 12 in transmitting compression loads between the sections 10 and 11. However, it will be observed that the bolt 13 is spaced a considerable distance from the rear end wall of the tube 43, and therefore does not assume any of the tension transmitted through the towbar. It is to be understood that the parts may be related so that the pin 13 is spaced between the ends of the elongated opening in the tube 43, in which case the allowable tensile and compression rating of the towbar are identical and the allowable torsional rating will, of course, depend upon the strength of the pin 13.

The shear bolt 13 is provided to shear off or fail when the towbar is subjected to excessive side loading or torsional loading. In accordance with the invention, the bolt 13 is weaker than the bolt 12, that is its cross-sectional area is less than the cross-section of the portion 40 of the bolt 12, assuming the bolts to be constructed of comparable or identical materials. Therefore, it will be seen that upon the application heavy side loads, the bolt 13 will shear off at the shear plane of the assembly and the bolt 12 will remain unbroken. Under these circumstances the bolt 12 will thereafter act temporarily as a fulcrum or pivotal connection between the two sections 10 and 11, permitting relative angular or pivotal movement of the sections.

The invention provides means for causing or bringing about the failure of the bolt 12 when it assumes the function of a pivot pin as just described. This means includes a substantially V-shaped notch or recess 48 in the forward end of the plate 18 and a stop or abutment pin 47 for cooperating with the wall of the recess. The pin 47 is fixed to the plate 19 of the section 11 and projects upwardly therefrom to enter or pass through the recess 48. I have shown the pin 47 welded in an opening in the plate 19, it being apparent that other means may be employed to secure the pin to the plate. The pin 47 is positioned so that it is spaced substantially midway between the divergent walls of the recess 48 when the sections 10 and 11 are connected by the shear pins or bolts 12 and 13. The forward or outer end of the recess 48 is open so that the pin 47 may move out of the recess without interference when the sections 10 and 11 become disconnected. The pin 47 preferably extends through the recess 48 to project a short distance into the interior of the section 10 so as to insure engagement with the wall of the recess 48 when there is short or limited angular movement between the sections 10 and 11 subsequent to breaking of the shear pin 13 under excessive torsional loading. Upon engaging the wall of the recess 48 the pin 47 serves as a fulcrum stop and maintained excessive torsional loading results in relative angular movement between the sections 10 and 11 with the pin 47 as a fulcrum so that the pin 12 is sheared off to release the sections 10 and 11 one from the other. In this connection it will be noted that the pin 47 has a diameter and a strength greater than the portion 40 of the shear bolt 12.

In use the towbar is readily connected with the landing gear of the airplane by the jaws 23 and 24, or the equivalent, and the hook 30 of the tractor or pulling vehicle is engaged in the ring 29 to couple the tractor with the towing bar. In normal usage the shear bolts 12 and 13 adequately transmit, between the towbar sections 10 and 11, all forces required to move or tow the airplane. The towbar may be equipped with shear bolts of adequate strength for the towing of airplanes of different weights, models and types. However, in the event that the tensile strain imposed on the towbar becomes excessive for any reason whatsoever and is of such a magnitude that it might damage the landing gear of the craft, the shear bolt 12 fails at the shear plane of the assembly allowing relative longitudinal movement between the sections 10 and 11. Immediately thereafter the shear bolt 13 and the rear wall of the tube 43 come into engagement and the somewhat weaker bolt 13 also shears off at the common shear plane. This completely disconnects the sections 10 and 11 and therefore uncouples the airplane from the towing vehicle.

When the airplane is being pushed by the tractor or towing vehicle, the two bolts 12 and 13 transmit the pushing forces between the sections 10 and 11. If such compression approaches a value that might cause injury to the airplane landing gear, the two shear pins 12 and 13 shear off simultaneously. This allows relative axial movement between the sections 10 and 11 and causes the inclined end surface 14 to engage the sloping plate 21 and brings the inclined end 17 and plate 20 into engagement. The engagement of these opposing inclined parts cams or moves the sections 10 and 11 relative to one another in a vertical direction. This relative lateral or vertical movement occurs before the stop pin 47 and the end wall of the recess 48 come into engagement and allows the pin 47 to move clear of the recess. The relative vertical movement of the sections 10 and 11 caused by the cooperation of the inclined plates and surfaces 20 and 21 and 17 and 14 allows the two towbar sections 10 and 11 to slide one over the other and therefore the sections do not buckle and jackknife as a result of continued or follow-through motion of the tractor.

In pulling or pushing the airplane the side load, or torsion, may become excessive to the point that the landing gear is subject to injury. If this occurs, the shear bolt 13 shears off at the plane of the two plates 18 and 19 allowing limited relative angular movement between the sections 10 and 11 with bolt 12 acting as a pivot or fulcrum. This brings the stop pin 47 and a side wall of the recess 48 into engagement so that the relative angular movement of the sections 10 and 11 is suddenly stopped and the bolt 12 shears off at the shear plane provided by the two plates 18 and 19. The two towbar sections 10 and 11 are thus freed from one another and fall apart.

It will be seen that I have provided a simple dependable towbar which fully protects the landing gear of the airplane or the towed vehicle against injury that might otherwise result from overloading the towbar. Upon failure of the shear bolts 12 and 13, the sections 10 and 11 move or fall apart without buckling or jackknifing, instantly relieving the landing gear or the towed vehicle of all further towing or pushing forces.

Having described only a typical preferred form of the invention, I do not wish to be limited to the specific details set forth but wish to reserve to myself any features or modifications that may fall within the scope of the following claims.

I claim:

1. A towbar comprising two towbar sections, means on one section for facilitating connection with a towing vehicle, means on the other section for facilitating connection with the object to be towed, the horizontal central axes of the two means lying in a common plane, the sections each presenting a flat surface and the surfaces of the two sections being in abutting engagement at a plane which includes the central longitudinal axis of the towbar and which is coincident with said common plane, and at least one shear pin engaged in the two sections and passing through said plane and axis.

2. A towbar comprising two elongate towbar sections, means on one section for coupling with the object to be towed, means on the other section for coupling with a towing or pushing instrumentality, the sections presenting flat axially extending surfaces which engage one with the other at a plane which includes the central longitudinal axis of the two assembled sections, the sections having two longitudinally spaced pairs of aligned openings, the longitudinal axes of said openings intersecting said longitudinal axis of the assembled sections, and a shear pin engaged in each of said pairs of aligned openings to pass through said plane, one of said openings being elongated axially of the assembled sections to allow axial movement of its respective shear pin therein.

3. A towbar comprising two elongate towbar sections, means on one section for coupling with the object to be towed, means on the other section for coupling with a towing or pushing instrumentality, the sections presenting flat axially extending surfaces which engage one with the other at a plane which includes the central longitudinal axis of the two assembled sections, the sections having two longitudinally spaced pairs of aligned openings, the longitudinal axes of said openings intersecting said longitudinal axis of the assembled sections, and a shear pin engaged in each of said pairs of aligned openings to pass through said plane, one of said openings being elongated axially of the assembled sections to allow axial movement of its respective shear pin therein, the pin which is engaged in said elongated opening having a lower shear strength value than the other pin.

4. A towbar comprising two elongate towbar sections, means on one section for coupling with the object to be towed, means on the other section for coupling with a towing or pushing instrumentality, the sections presenting flat axially extending surfaces which engage one with the other at a plane which includes the central longitudinal axis of the two assembled sections, the sections having two longitudinally spaced pairs of aligned openings, the longitudinal axes of said openings intersecting said longitudinal axis of the assembled sections, a shear pin engaged in each of said pairs of openings to pass through said plane and said central axis, one of said pins having a lower shear strength than the other so as to fail prior to said other pin when the towbar is subjected to excessive side loads, said other pin thereafter serving as a fulcrum to allow relative angular movement between the sections, and positive stop parts on the sections for limiting such angular movement so that said other pin is sheared off by said side loads.

5. A towbar comprising two elongate towbar sections, means on one section for coupling with the object to be towed, means on the other section for coupling with a towing or pushing instrumentality, the sections presenting flat axially extending surfaces which engage one with the other at a plane which includes the central longitudinal axis of the two assembled sections, the sections having two longitudinally spaced pairs of aligned openings, the longitudinal axes of said openings intersecting said longitudinal axis of the assembled sections, a shear pin engaged in each of said pairs of openings to pass through said plane and said central axis, one of said pins having a lower shear strength than the other so as to fail prior to said other pin when the towbar is subjected to excessive side loads, said other pin thereafter serving as a fulcrum to allow relative angular movement between the sections, and positive stop means on the sections for limiting such angular movement so that said other pin is sheared off by said side loads, said positive stop means comprising spaced abutments on one section, and a stop pin on the other section spaced between the abutments to engage one or the other of said abutments upon said relative angular movement of the sections.

6. A towbar of the character described comprising two bar sections, one to be coupled with the object to be towed, the other to be coupled with a towing instrumentality, the two sections being arranged to constitute an elongate assembly, the sections having flat opposing surfaces which engage at a plane which extends axially of the assembly and which is diametric of the longitudinal axis of the assembly, two pairs of aligned transverse openings in the sections, shear pins arranged in said openings to intersect said plane, one of said pins having a lower shear strength than the other so as to fail prior to said other pin when the towbar is subjected to excessive side loading, said other pin thereupon serving as a fulcrum to allow relative angular movement of the sections, one section having a recess entering it from one end, and a stop pin on the other section adapted to cooperate with a wall of the recess to stop said angular movement so that said other pin is sheared off by the said loading.

7. A towbar of the character described comprising two bar sections, one to be coupled with the object to be towed, the other to be coupled with a towing instrumentality, the two sections being arranged to constitute an elongate assembly, the sections having flat opposing surfaces which engage at a plane which extends axially of the assembly and which is diametric of the longitudinal axis of the assembly, two pairs of aligned transverse openings in the sections, shear pins arranged in said openings to intersect said plane and said axis, and a shear pin engaged in each pair of said openings to connect the sections, one of said openings being elongated axially of the assembly to allow axial movement of its respective shear pin, said respective pin having a lower shear strength than the other pin and engaging one end wall of said elongated opening to assist said other pin in the transmission of compressions imposed on the towbar, said other pin serving alone to assume the tensile loads transmitted by the towbar.

8. A towbar for connecting a towing instrumentality with a vehicle to be moved comprising a first tube section having a portion of substantially half-tube form, a plate on said portion lying in a plane diametric of the longitudinal axis of the section, means on the section for coupling with said instrumentality, correspondingly inclined faces on the section at the opposite ends of said plate, a second tube section having a portion of substantially half-tube form, a plate on the last named portion lying in a plane diametric of the longitudinal axis of the section and engaging against the plate on the first tube section, correspondingly inclined faces on the second tube section in adjacent opposing and generally parallel relation with the inclined faces of the first section, means on the second section for coupling with said vehicle, aligned openings in said plates, and at least one shear pin engaged in said openings to connect the sections, said inclined opposing faces cooperating to guide the sections one past the other upon failure of the pin by compressive loading of the towbar.

9. A towbar for connecting a towing instrumentality with a vehicle to be moved comprising a first tube section having a portion of substantially half-tube form, a plate on said portion lying in a plane diametric of the longitudinal axis of the section, means on the section for coupling with said instrumentality, correspondingly inclined faces on the section at the opposite ends of said plate, a second tube section having a portion of substantially half-tube form, a plate on the last named portion lying in a plane diametric of the longitudinal axis of the section and engaging against the plate on the first tube section, correspondingly inclined faces on the second tube section in adjacent opposing and generally parallel relation with the inclined faces of the first, section, means on the second section for coupling with said vehicle, two pairs of aligned transverse openings in said plates, shear pins engaged in said aligned openings to connect the sections, one of said openings being elongated axially of the towbar so that the pin engaged therein may move axially, said pin having a lower shear strength than the other pin and engaging one end wall of the elongated opening to assist said other pin in assuming compression loads on the towbar, said other pin serving to assume the tensile loads, said inclined opposing faces cooperating to guide the sections one past the other upon failure of the pins under excessive compression loading of the towbar.

10. A towbar for connecting a towing instrumentality with a vehicle to be moved comprising a first tube section having a portion of substantially half-tube form, a plate on said portion lying in a plane diametric of the longitudinal axis of the section, means on the section for coupling with said instrumentality, correspondingly inclined faces on the section at the opposite ends of said plate, a second tube section having a portion lying in a plane diametric of the longitudinal axis of the section and engaging against the plate on the first tube section, correspondingly inclined faces on the second tube section in adjacent opposing and generally parallel relation with the inclined faces of the first section, means on the second section for coupling with said vehicle, two pairs of aligned transverse openings in said plates, shear pins engaged in said aligned openings to connect the sections, one of said openings being elongated axially of the towbar so that the pin engaged therein may move axially, said pin having a lower shear strength than the other pin and engaging one end wall of the elongated opening to assist said other pin in assuming compression loads on the towbar, said other pin serving to assume the tensile loads, said inclined opposing faces cooperating to guide the sections one past the other upon failure of the pins under compression loading of the towbar, the pin of lower shear strength being adapted to fail prior to said other pin when the towbar is subjected to excessive torsional loading to allow the sections to swing one relative to the other about said other pin, and positive stop means on the sections for limiting such relative movement to cause failure of said other pin.

11. In a towbar, two sections related to provide a single shear plane, a shear pin connecting the sections to pass transversely through said plane and adapted to fail under excessive tensile or compression loads imposed on the towbar, and a second pin passing transversely through said plane and associated with said sections to fail upon the application of excessive torsional loading to the towbar.

TRACY S. HOLMES.

REFERENCES CITED

The following references are of record in the file of this patent:

UNITED STATES PATENTS

| Number | Name | Date |
|---|---|---|
| 1,394,793 | Rutten | Oct. 25, 1921 |
| 1,483,514 | Kiel | Feb. 12, 1924 |
| 2,348,741 | Jessen | May 16, 1944 |
| 2,391,608 | Wood | Dec. 25, 1945 |